United States Patent [19]

Hazlebeck

[11] Patent Number: 5,399,640
[45] Date of Patent: Mar. 21, 1995

[54] POLYMERIZATION OF LIQUID TETRAFLUOROETHYLENE IN AQUEOUS DISPERSION

[75] Inventor: David E. Hazlebeck, Hockessin, Del.

[73] Assignee: W. L. Gore & Associates, Inc., Newark, Del.

[21] Appl. No.: 245,326

[22] Filed: May 18, 1994

Related U.S. Application Data

[63] Continuation-in-part of Ser. No. 113,532, Aug. 27, 1993.

[51] Int. Cl.$^6$ .............................................. C08F 2/00
[52] U.S. Cl. ...................................... 526/214; 526/255
[58] Field of Search ............................... 526/214, 255

[56] References Cited

U.S. PATENT DOCUMENTS 3,607,878  9/1971  Dullins et al. ........................ 526/94
4,384,092  5/1983  Blaise et al. .

FOREIGN PATENT DOCUMENTS 592035    2/1960   Canada .
0248446  12/1987   European Pat. Off. .
45-9071   4/1970   Japan .
47-28086  7/1972   Japan .
574688    1/1946   United Kingdom .
1397931   6/1975   United Kingdom .

Primary Examiner—Joseph L. Schofer
Assistant Examiner—N. Sarofim
Attorney, Agent, or Firm—Gary A. Samuels

[57] ABSTRACT

Novel polytetrafluoroethylene structures are described, which were prepared by polymerizing liquid tetrafluoroethylene in aqueous dispersion. The novel structures include continuous three-dimensional networks of fibrils and bundles of fibrils.

6 Claims, 7 Drawing Sheets

POLYMERIZATION OF LIQUID TETRAFLUOROETHYLENE IN AQUEOUS DISPERSION

CROSS REFERENCES TO RELATED APPLICATION

This application is a continuation-in-part of application Ser. No. 08/113,532, filed Aug. 27, 1993.

FIELD OF THE INVENTION

This invention relates to polytetrafluoroethylene materials and to free radical polymerization of liquid tetrafluoroethylene in aqueous dispersion.

BACKGROUND OF THE INVENTION

Emulsion polymerization of gaseous tetrafluoroethylene (TFE) or its copolymers is known. Aqueous colloidal dispersions of PTFE or TFE comonomer systems can be prepared in a pressure reactor by placing gaseous TFE monomer, or a mixture of it and comonomers in contact with an aqueous solution containing at least one emulsifier which generally is a fluorinated surfactant, possibly a buffer for keeping the medium at a given pH, and at least one initiator capable of forming free radicals at the polymerization temperature. The free radical initiators are usually water soluble peroxides, or alkaline or ammonium persulfates. Persulfate can be used alone if the polymerization temperature is above approximately 50° C., or in association with a reducing agent such as ferrous salt, silver nitrate, or sodium bisulfite if the polymerization temperature is approximately between 5° to 55° C., as described in the U.S. Pat. No. 4,384,092. The fluorinated surfactants can be anionic, cationic, or nonionic surfactants that possess fluorine atoms and possibly chlorine or hydrogen atoms. However, the most commonly used surfactants are the salts of perfluorinated carboxylic acids or the salts of perfluorinated sulfonic acids. The gaseous monomer molecules enter the aqueous liquid and react to form polymer without first forming a distinct liquid phase.

Emulsion polymerization of tetrafluoroethylene in general produces colloidal particles in the shape of spherical, ellipsoidal, rod-like, or sometimes needle like. The colloidal particles produced by conventional methods are all in a distinct domain (discontinuous) where the aqueous phase is continuous.

SUMMARY OF THE INVENTION

In this invention polymerization of liquid monomer takes place, rather than gaseous monomers as in the prior art.

The ingredients, ratios and conditions are selected to result in polymerization of liquid tetrafluoroethylene (TFE) and optionally, minor amounts of other fluorinated ethylenically-unsaturated monomers that can be present. Free radical polymerization of the monomers produces polymers of tetrafluoroethylene. The polymers have a three-dimensional continuous micro-network of fibrils and bundles of fibrils and randomly dispersed platelets.

In one aspect of the invention, the polymer produced is a gel characterized as a spongy mass comprised visually of layers of sheet-like configurations, and which has a microstructure of a three-dimensional continuous network of convoluted randomly disposed fibrils and bundles of fibrils.

In another aspect, the polymer produced is characterized as a spongy mass having a microstructure of predominantly randomly disposed platelets interconnecting or interpenetrating one another and also being randomly connected by randomly disposed fibrils, to form a three-dimensional continuous network.

By microstructure is meant that the structure is not visible to the naked eye.

The polymer can be in solid form or can be a gel, especially a hydrogel.

While the polymerization mechanism is not well understood, it is believed to be polymerization of a bicontinuous microemulsion system. A bicontinuous microemulsion system contains both oil (monomer) phase and aqueous phase intertwined into each other, separated by surfactant layers. A rapid polymerization of the monomers (oil phase) can capture the unpolymerized microstructure.

DETAILED DESCRIPTION OF THE INVENTION

Figure 1:
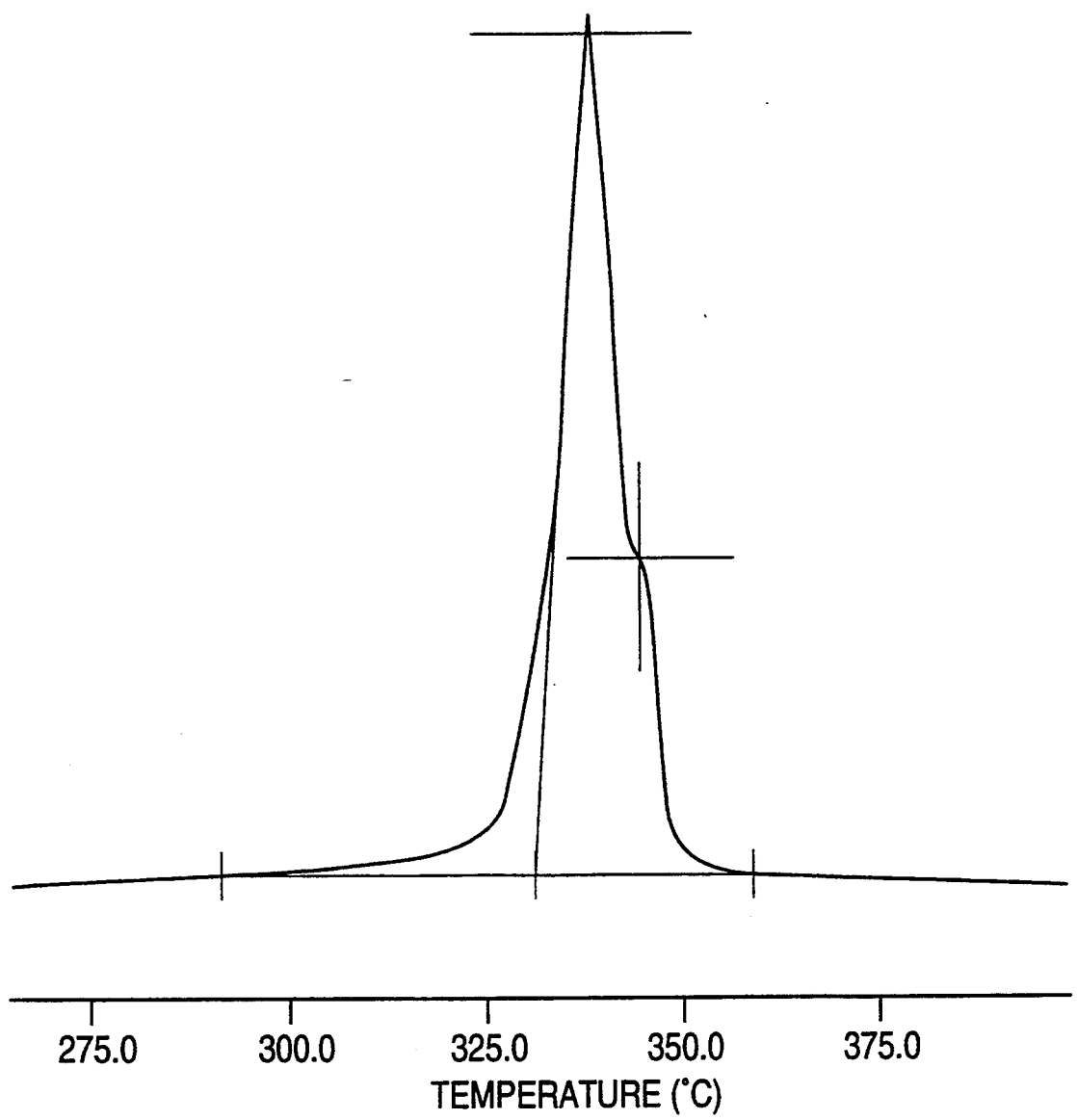
FIG. 1 is a DSC scan of the material in Example 1.

To form the polymers of this invention, a mixture of liquid tetrafluoroethylene monomer and at least one fluorinated surfactant in water is employed. In this invention the TFE is introduced to the reaction vessel in liquid form and the amount of surfactant used in the reaction is adjusted to maximize the formation of bicontinuous microemulsion system. It is believed that a bicontinuous microemulsion is formed spontaneously. A suitable fluorinated surfactant or a mixture of fluorinated surfactants are needed with the weight ratio of the surfactants to all monomers (in the liquid phase) at least 1:10 and preferably from 1:4 or 1:2 or higher in surfactant concentration. There is no criticality in an upper limit, but generally one usually does not go higher than 5:1. The amounts of the surfactants employed are 0.5 to 50 weight percent, preferably 1 to 20 percent; the amounts of total monomers (in the liquid phase) are 0.5 to 50 weight percent; preferably 1 to 30 percent; with the remainder water and optionally some salts. Suitable fluorinated surfactants include a fluorinated anionic surfactant, for example a salt of a fluorinated carboxylic acid or a sulfonic acid, a sulfate, a cationic surfactant for example a fluorinated quartenary ammonium salt; or a fluorinated nonionic surfactant. The mixture is formed at a temperature below the critical temperature (Tc) of TFE for example approximately 33.3° C. for TFE, and above the freezing temperature of the surfactant containing aqueous solution. Pressure should be below the critical pressure of TFE (below 39 atm). Mechanical stirring can be provided. Free radical polymerization can be initiated by adding water-soluble free radical initiators, for example, a peroxide, an alkaline or ammonium persulfate, or some water soluble azo compounds or a salt of permanaganate. The free radical initiators can also be used in association with a reducing agent such as ferrous salt, silver nitrate, sodium bisulfite, and the like. It is also possible to initiate the polymerization by photochemical reactions. The possible photoradiation source include ultraviolet (UV) light, electron beam, or gamma radiation. The polymerization temperature is below the critical temperature of polytetrafluoroethylene which is about 33.3° C. A lower temperature can be any temperature above the freezing point of the mixture, but practically about 5° C. is preferred.

Comonomers that may be present in the mixture include halogenated (chlorine or fluorine) olefins of 2–18 carbon atoms, for example vinyl chloride, vinyl idene chloride, chlorotrifluoroethylene, hexafluoropropylene, perfluoroalkyl vinyl ether, or the like; hydrogenated unsaturated monomers, such as ethylene, propylene, isobutylene, vinyl acetate, acrylates, or the like; crosslinking agents, such as glycidylvinylether, chloroalkyl vinyl ether, allyl-glycidylether, acrylates, methacrylates, or the like. The amount of comonomer that can be present should not be so great as to change the nature of the product that would be obtained if PTFE had been the product.

Free radical polymerization of the unsaturated monomers in such aqueous system can sometimes yield an aqueous medium containing colloidal fluorinated olefins having three-dimensional continuous network microstructure or can yield a spongy gel material.

The resulting sponge-like polymers can be mixed with other chemicals, polymers, pigments, carbons, or metals to form a composite material such as a polymer alloy, a stain resistant mold release coating on articles, or electronic conductors or shieldings, etc. They can be used to impart ultrafine surface coatings on substrates, such as fabrics, metals, ceramics, etc. The sponge-like polymers can also be used to coat microporous articles such as expanded PTFE article to make pore opening smaller.

In addition, the polymers can be used as a white pigment or a modifier which improves flame resistance, non-tackiness, sliding properties, water repellency, soil resistance, corrosion resistance, and weather resistance properties on various substrates, porous or nonporous. The polymers can be also used to form a membrane for filtration, microfiltration or ultrafiltration applications.

EXAMPLE 1

In a 2-liter pressure vessel, 900 gram distilled water, 140 grams ammonium perfluoroctanoate and 0.2 gram of ammonium persulfate were charged and the vessel was kept at 22° C. The vessel was purged with nitrogen, followed by pulling a vacuum. The vessel was then purged with tetrafluoroethylene gas, followed by pulling another vacuum. Purging the vessel with tetrafluoroethylene gas followed by vacuum was repeated three times. The oxygen content of the aqueous phase was about 28 ppm. Then, liquid tetrafluoroethylene monomer was charged to the vessel. Approximately 230 grams of tetrafluoroethylene liquid was introduced into the aqueous mixture. The vapor phase over the vessel contents filled spontaneously with tetrafluoroethylene gas to a pressure of about 30 $Kg/cm^2$. The liquid phase was stirred with a constant speed of about 400 rpm.

0.1 gram of sodium sulfite and 0.1 gram of ferrous sulfate in 100 grams of distilled water was charged to the vessel. Polymerization started instantaneously. The vessel was kept at a temperature between 25° to 30° C. by cooling the vessel with cold brine, and the pressure was between 34 to 40 $K/cm^2$. Reaction proceeded for about 95 minutes and stopped. When the pressure inside the vessel was released, a lot of foam came out. The pressure vessel was found to be filled with sponge-like white gel material. The gel was taken out by a spoon. When the gel was placed in boiling water for about 10 minutes it did not melt, nor was the shape deformed. Visually, the white material has a spongy layered structure. The gel material was washed several times with distilled water and dried in an oven at a temperature of about 140° C. for 24 hours. The dried material still looked white and felt like a sponge. The total weight was about 230 grams.

Figure 2:
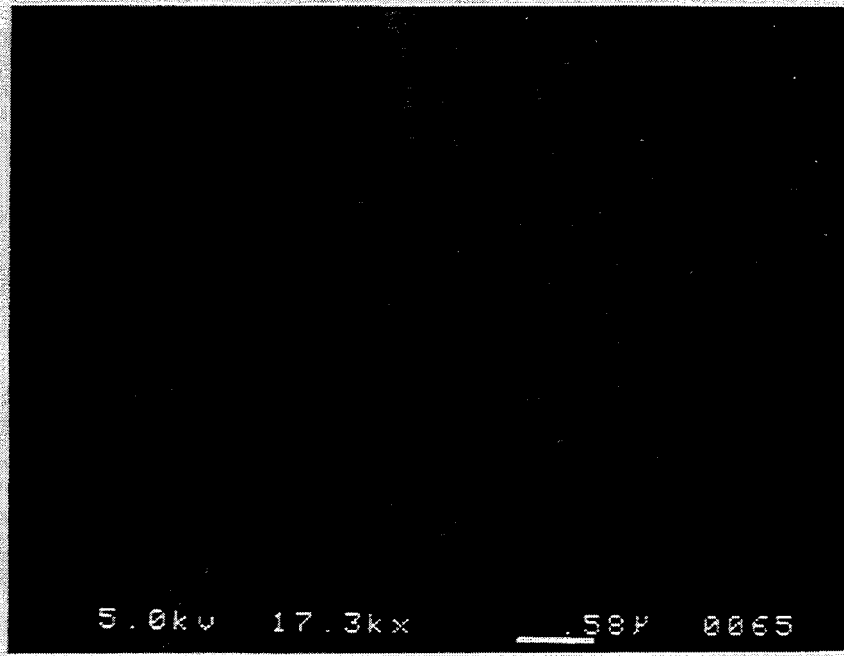
FIGS. 2 and 3 are photomicrographs of the material of Example 1.
Figure 3:
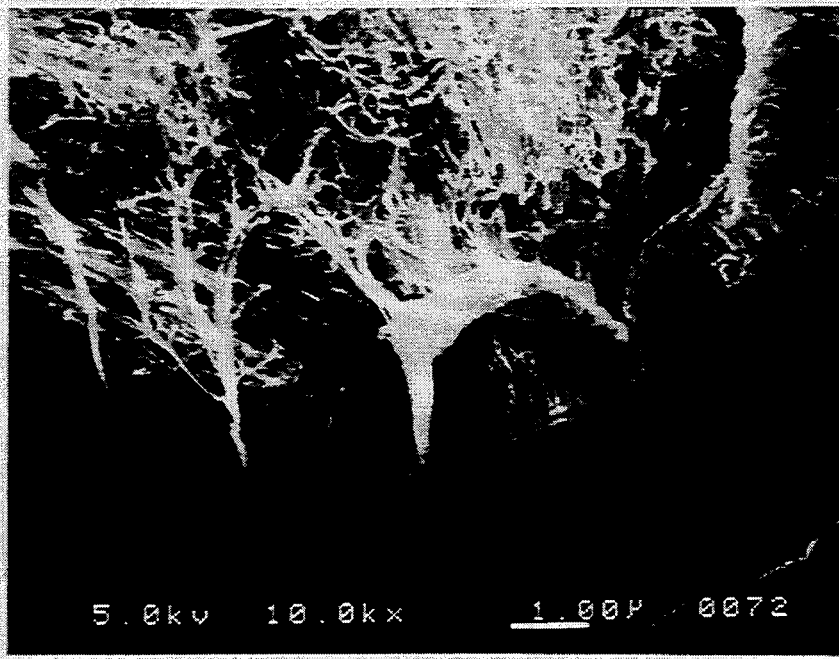

The material was subjected to tests for characterization. Thermal analysis of the dried material confirmed the material to be polytetrafluoroethylene. Differential scanning calorimetry (DSC) analysis showed this material has a melting temperature at about 339° C., as shown in FIG. 1. DSC was run at a heating rate of 10° C./min. Scanning electron microspy (SEM) showed that the material has not only layers of sheet like microstructure but also 3-dimensional continuous network structure of fibrils and fibril bundles (as seen in FIGS. 2 and 3) sometimes platelets interpenetrating or interconnecting each other are observed. The fibril structure looks like tree roots entangled with each other.

Surface analysis on the sponge-like material taken from the center of the reactor vessel shows its surface area to be about 19.5 $m^2$/gram and its average pore diameter to be about 20 Angstroms. These measurements were made by Porous Materials, Inc., Analytical Services Division at Cornell Industrial, Research Park, Ithica, N.Y. using an auto adsorption system with nitrogen as adsorbate. The instrument temperature was 303.36K and room temperature was 298.56K. Sample weight is 1.11 gram and was outgassed to $2 \times 10^{-5}$ atmosphere vacuum at about 24° C. Surface area was calculated by volumetric multipoint BET method and the average pore diameter is calculated by the Pierce method.

EXAMPLE 2

In a 2-liter pressure vessel, 1000 grams distilled water, 70 grams ammonium perfluorooctanoate and 0.2 gram of ammonium persulfate were charged and the vessel kept at 15° C. The vessel was purged with nitrogen followed by a vacuum. The vessel was then purged with tetrafluoroethylene gas followed by a vacuum. Purging the vessel with tetrafluoroethylene gas followed by a vacuum was repeated three times. The oxygen content of the aqueous phase was about 21 ppm. Then, liquid tetrafluoroethylene monomer was charged to the vessel. Approximately 120 grams of tetrafluoroethylene liquid was charged to the aqueous mixture. The vapor phase above the liquid filled with tetrafluoroethylene gas with a pressure about 27.5 $Kg/cm^2$. The liquid phase was stirred at a constant speed of about 400 rpm.

0.2 gram of sodium sulfite and 0.1 gram of ferrous sulfate in 100 grams of distilled water was charged to the vessel, and polymerization started instantaneously. The vessel was kept at a temperature between 15° to 25° C. and the pressure was between 28 to 31 $Kg/cm^2$. The reaction proceeded for about 106 minutes and stopped. A transparent to translucent aqueous dispersion, slightly viscous, was obtained. The aqueous dispersion was subjected to a centrifuge at a rotation speed about 1000 rpm for about 10 minutes. The aqueous dispersion remained stable, with no coagulation. The aqueous dispersion was coagulated with acetone and yielded a sponge-like white material. The sponge-like material was washed several times by acetone and dried in an oven at a temperature of about 140° C. for 24 hours. The dried material was still white.

The material was subjected to tests for characterization.

Figure 4:
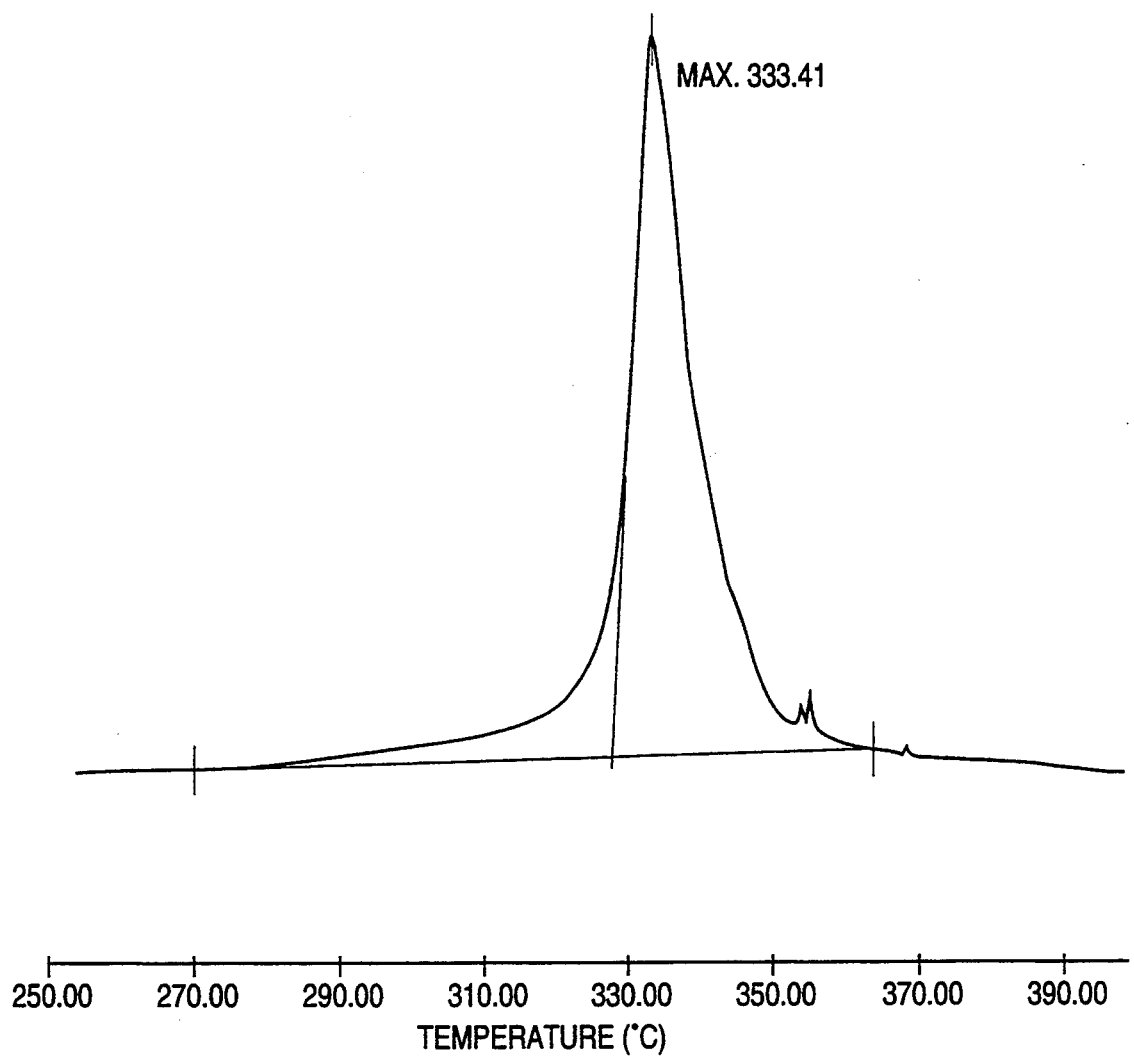
FIG. 4 is a DSC scan of the material of Example 2.
Figure 5:
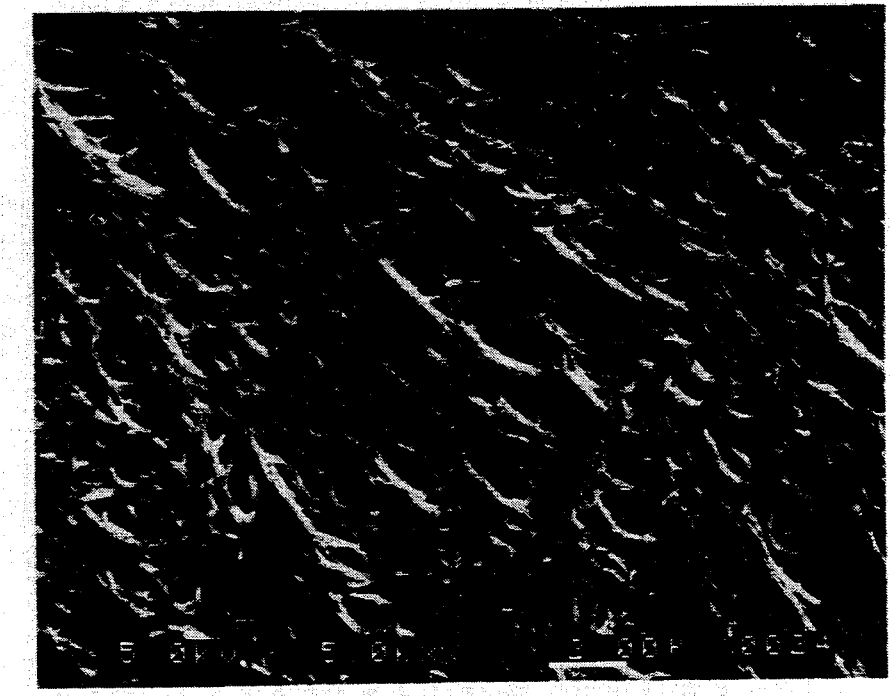
FIGS. 5 and 6 are photomicrographs of the material in Example 2.
Figure 6:

DSC results on the air dried material indicated that it has melting characteristics of polytetrafluoroethylene, as shown in FIG. 4. SEM results on the air dried colloidal material showed remarkably randomly disposed microfibrils and microfibril bundles interconnecting and interpenetrating each other forming a three-dimensional continuous network structure of a convoluted, non-aligned nature, as shown in FIGS. 5 and 6.

EXAMPLE 3

In a 2-liter pressure vessel, 1000 grams distilled water, 35 grams ammonium perfluorooctanoate, and 0.2 gram of ammonium persulfate were charged and the vessel kept at 15° C. The vessel was purged with nitrogen followed by a vacuum. The vessel was then purged with tetrafluoroethylene gas followed by a vacuum. Purging the vessel with tetrafluoroethylene gas followed by a vacuum was repeated three times. The oxygen content of the aqueous phase was about 14 ppm. Then, tetrafluoroethylene liquid monomer was charged to the vessel. Approximately 30 grams of tetrafluoroethylene liquid was charged to the aqueous mixture. The vapor phase filled with tetrafluoroethylene gas with pressure about 26 Kg/cm$^2$. The liquid phase was stirred with a constant speed of about 400 rpm.

0.2 gram of sodium sulfite and 0.1 gram of ferrous sulfate in 100 grams of distilled water was charged to the vessel. Polymerization started instantaneously. The vessel was kept at a temperature between 15° to 20° C. and the pressure was between 27 to 28 Kg/cm$^2$. The reaction proceeded for about 105 minutes and stopped. A transparent aqueous dispersion was obtained. The aqueous dispersion was subjected to a centrifuge at a rotation speed about 1000 rpm for about 10 minutes. The aqueous dispersion remained stable with no coagulation. The aqueous dispersion was coagulated with acetone and the resulting product was a sponge like white material. The sponge-like material was washed several times with acetone and dried in an oven at a temperature of about 140° C. for 24 hours. The dried material was white and felt like a sponge.

The material was subjected to tests for characterization.

Figure 7:
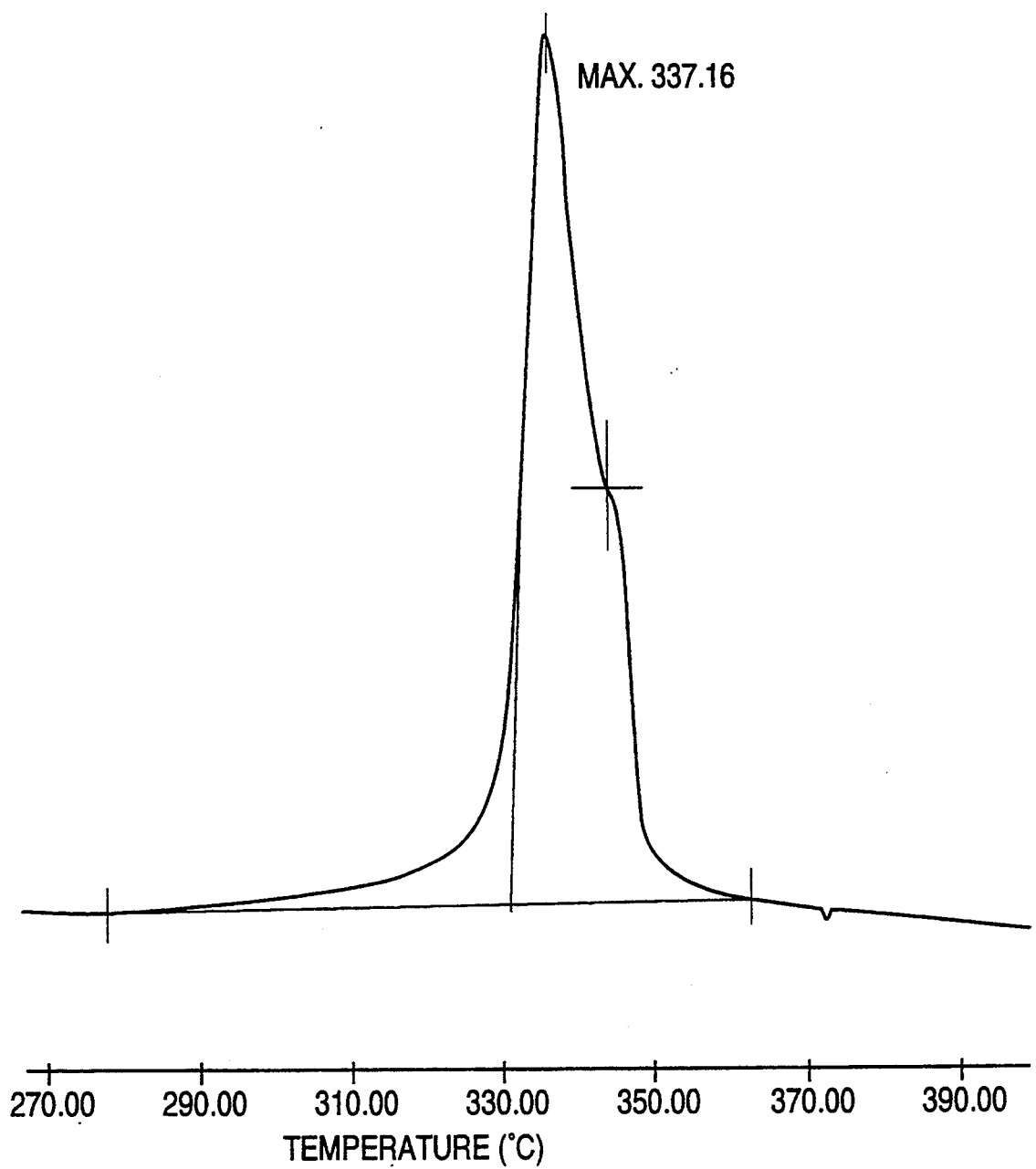
FIG. 7 is a DSC scan of the material of Example 3.
Figure 8:
FIGS. 8 and 9 are photomicrographs of the material of Example 3.
Figure 9:
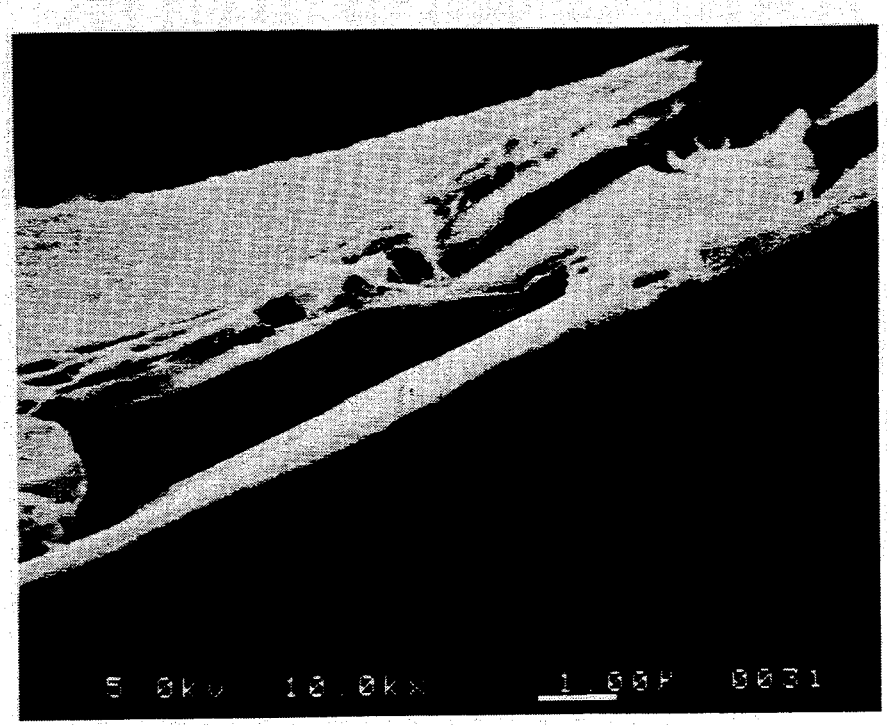

DSC results on the dried material showed melting characteristics of polytetrafluoroethylene, as shown in FIG. 7. SEM results on the material showed remarkably randomly disposed platelets and microfibrils interconnecting or interpenetrating each other forming a three-dimensional continuous network structure, as shown in FIGS. 8 and 9.

EXAMPLE 4

Figure 10:
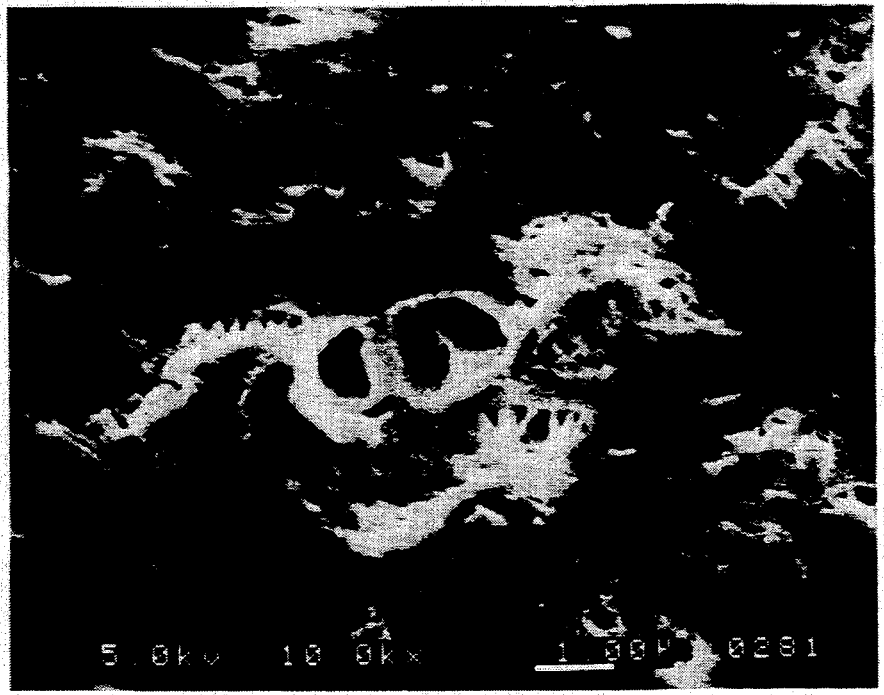
FIG. 10 is a photomicrograph of the coated membrane of Example 4.

A piece of expanded porous polytetrafluoroethylene membrane provided by W. L. Gore & Associates, Inc. was used for testing. The membrane had an air permeability of a Gurley number of about 12 seconds and an average nominal pore size of about 0.2 micrometer. I part of the aqueous dispersion obtained from Example 2 was diluted with 3 parts of distilled water. The diluted dispersion was used to coat one side of the membrane with a nylon brush. The coated membrane was then placed in an oven at a temperature about 200° C. for 3 minutes. The coated membrane had good air permeability, as seen by a Gurley number of about 15 seconds. The porosity of the coated membrane was examined by SEM, as shown in FIG. 10. It appears the coating covers the pore openings to some extent.

The air permeability of samples was measured by a Gurley densometer (ASTM) D726-58) manufactured by W & L E Gurley & Sons. The results are reported in terms of Gurley number which is the time in seconds of 100 cubic centimeters of air to pass through 1 square inch of a test sample at a pressure drop of 4.88 inches of water.

We claim:

1. A polytetrafluoroethylene material characterized in that it is a spongy mass comprised visually of layers of sheet-like configuration and has a microstructure of a three-dimensional continuous network of convoluted randomly disposed submicron diameter fibrils and bundles of submicron diameter fibrils.

2. A polytetrafluoroethylene material characterized in that it is a spongy mass comprised of a microstructure of predominantly randomly disposed platelets interconnecting or interpenetrating one another and also being randomly connected by randomly disposed submicron fibrils to form a three-dimensional continuous network.

3. The material of claim 1 or 2 in the form of a gel.

4. The material of claim 1 or 2 where the polytetrafluoroethylene is a homopolymer.

5. The material of claim 1 or 2 where the polytetrafluoroethylene contains comonomer units.

6. The material of claim 5 wherein the comonomer units are selected from the class consisting of halogenated olefins, hydrogenated unsaturated monomers, and crosslinking monomers.

* * * * *

UNITED STATES PATENT AND TRADEMARK OFFICE
CERTIFICATE OF CORRECTION

PATENT NO. : 5,399,640
DATED : March 21, 1995
INVENTOR(S) : Huey Shen Wu, et al.

It is certified that error appears in the above-identified patent and that said Letters Patent is hereby corrected as shown below:

TITLE PAGE:

[75] Change Inventor from "David E. Hazlebeck" to"

--Huey Shen Wu, Newark, DE; Jack Hegenbarth, Wilmington, DE; David E. Hazlebeck, Hockessin, DE--

Signed and Sealed this

Fifth Day of September, 1995

Attest:

BRUCE LEHMAN

Attesting Officer

Commissioner of Patents and Trademarks